United States Patent [19]

Denny

[11] Patent Number: 5,216,762
[45] Date of Patent: Jun. 8, 1993

[54] FLOATING POOL COVER APPARATUS

[76] Inventor: Thomas P. Denny, 1631 W. Catalina Dr., Phoenix, Ariz. 85015

[21] Appl. No.: 796,812

[22] Filed: Nov. 25, 1991

[51] Int. Cl.⁵ .............................................. E04H 4/08
[52] U.S. Cl. ......................................... 4/498; 126/566
[58] Field of Search ..................................... 4/498–500, 4/503, 493; 126/417, 426, 415

[56] References Cited

U.S. PATENT DOCUMENTS

| | | | |
|---|---|---|---|
| 3,072,920 | 1/1963 | Yellott | 4/498 |
| 3,949,095 | 4/1976 | Pelehach et al. | 126/415 |
| 4,022,187 | 5/1977 | Roberts | 4/493 X |
| 4,366,806 | 1/1983 | Acker | 4/498 |
| 5,067,182 | 11/1991 | Koelsch | 4/498 |

FOREIGN PATENT DOCUMENTS

| | | | |
|---|---|---|---|
| 0044104 | 1/1982 | European Pat. Off. | 4/499 |
| 2315067 | 1/1977 | France | 126/415 |
| 0008540 | 1/1977 | Japan | 126/415 |

Primary Examiner—Charles E. Phillips
Attorney, Agent, or Firm—Leon Gilden

[57] ABSTRACT

A floating pool cover arranged for flotation about the top surface of a swimming pool to provide for passive heating during periods of depressed temperatures and reflection of heat during periods of elevated temperatures is provided as a housing formed with an opaque darkened bottom floor and a convex transparent top, with ends defining a top wall of the housing wherein spaced first and second buoyant chambers are formed coextensively at opposed end walls of the organization. The invention is further arranged to include interlocking pegs received within accommodating apertures between adjacent panels to provide for a matrix of the housings for flotation and accommodation of variously configured pools. Further, the organization may be optionally provided with a releasing chamber to direct chemical into the underlying pool during periods of elevated temperature conditions.

3 Claims, 4 Drawing Sheets

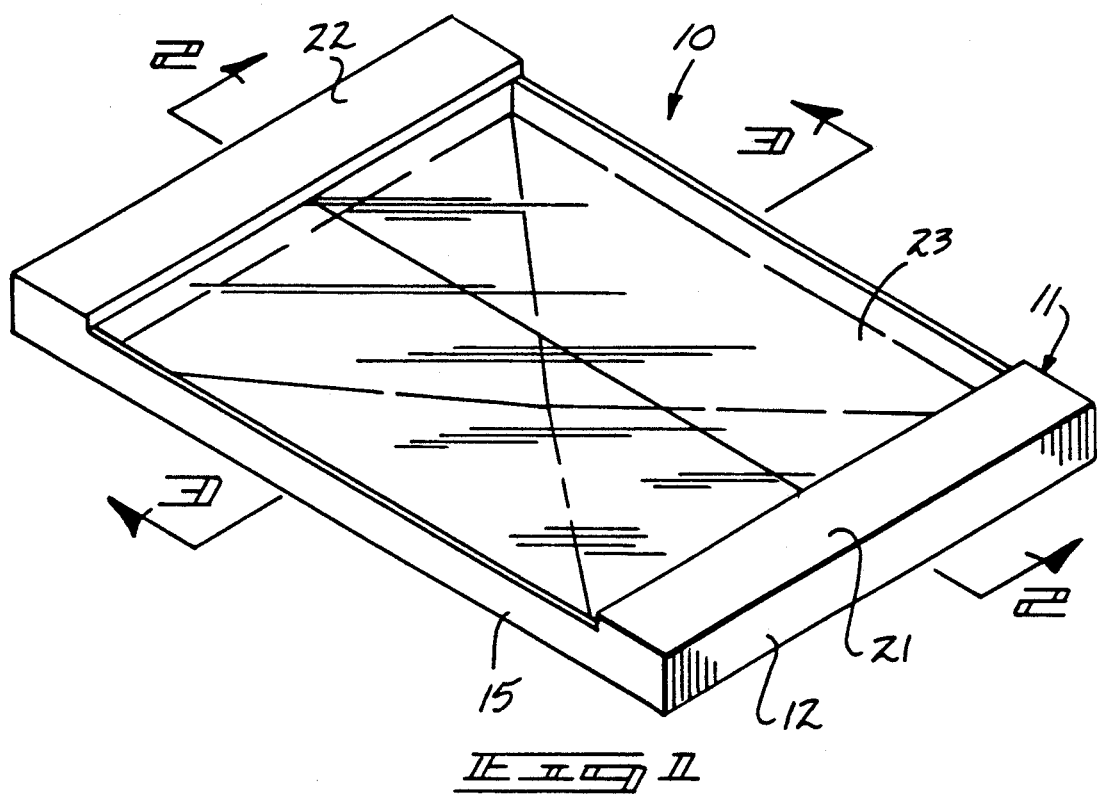
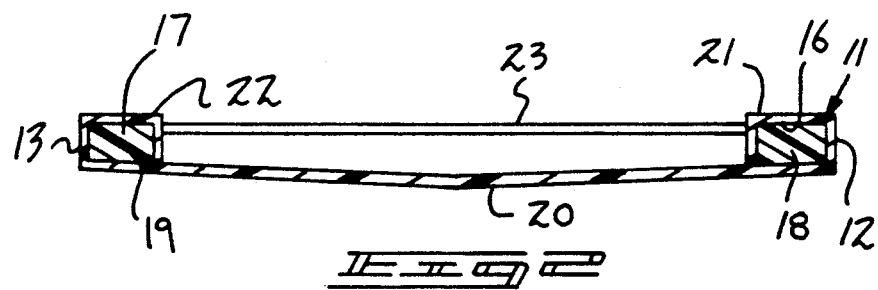
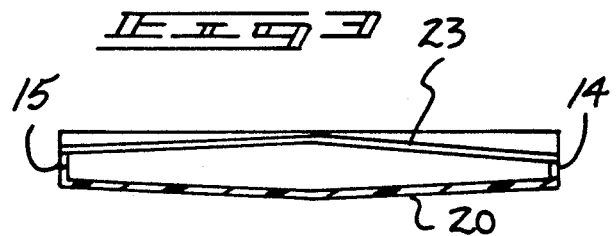

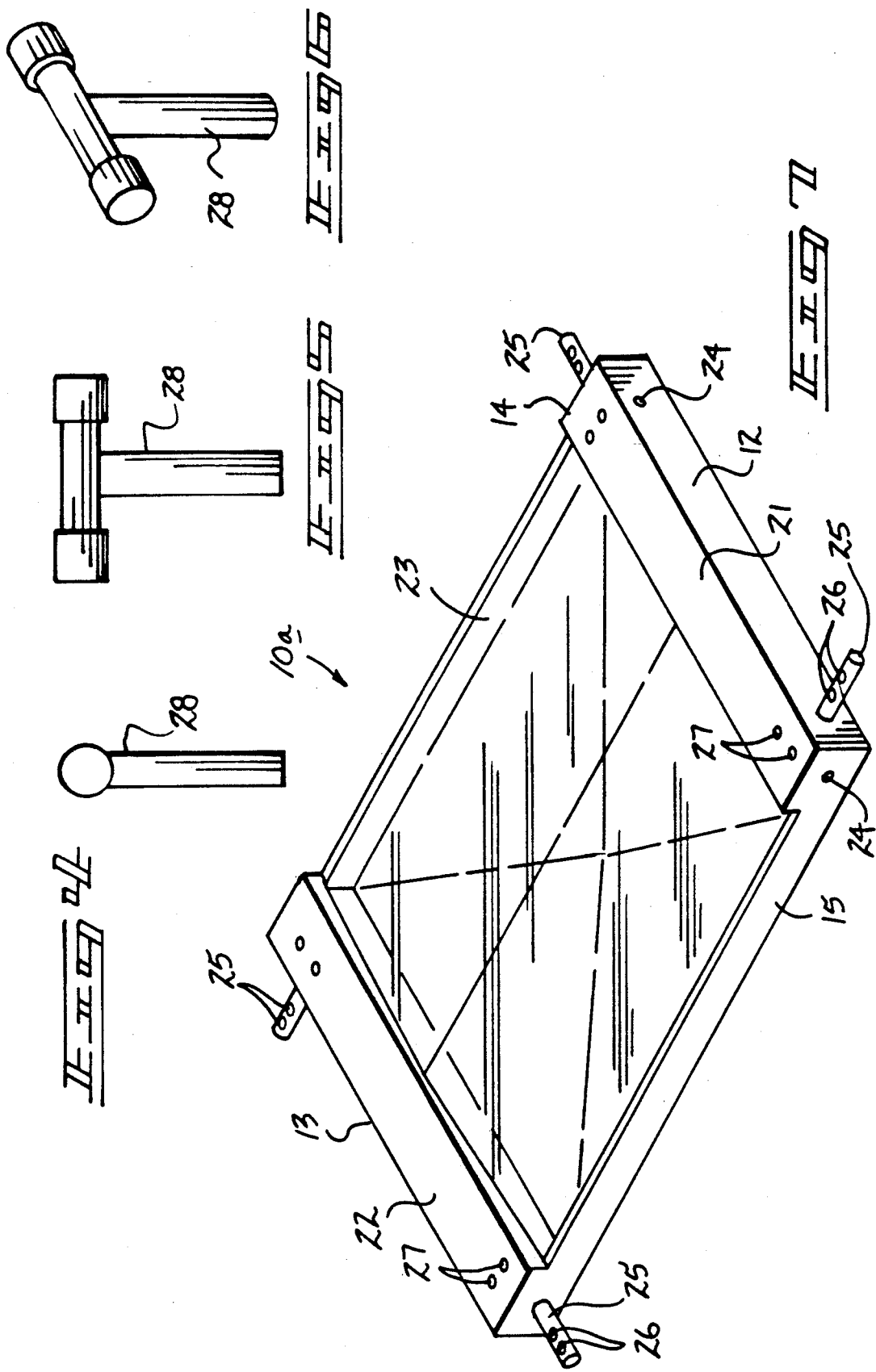

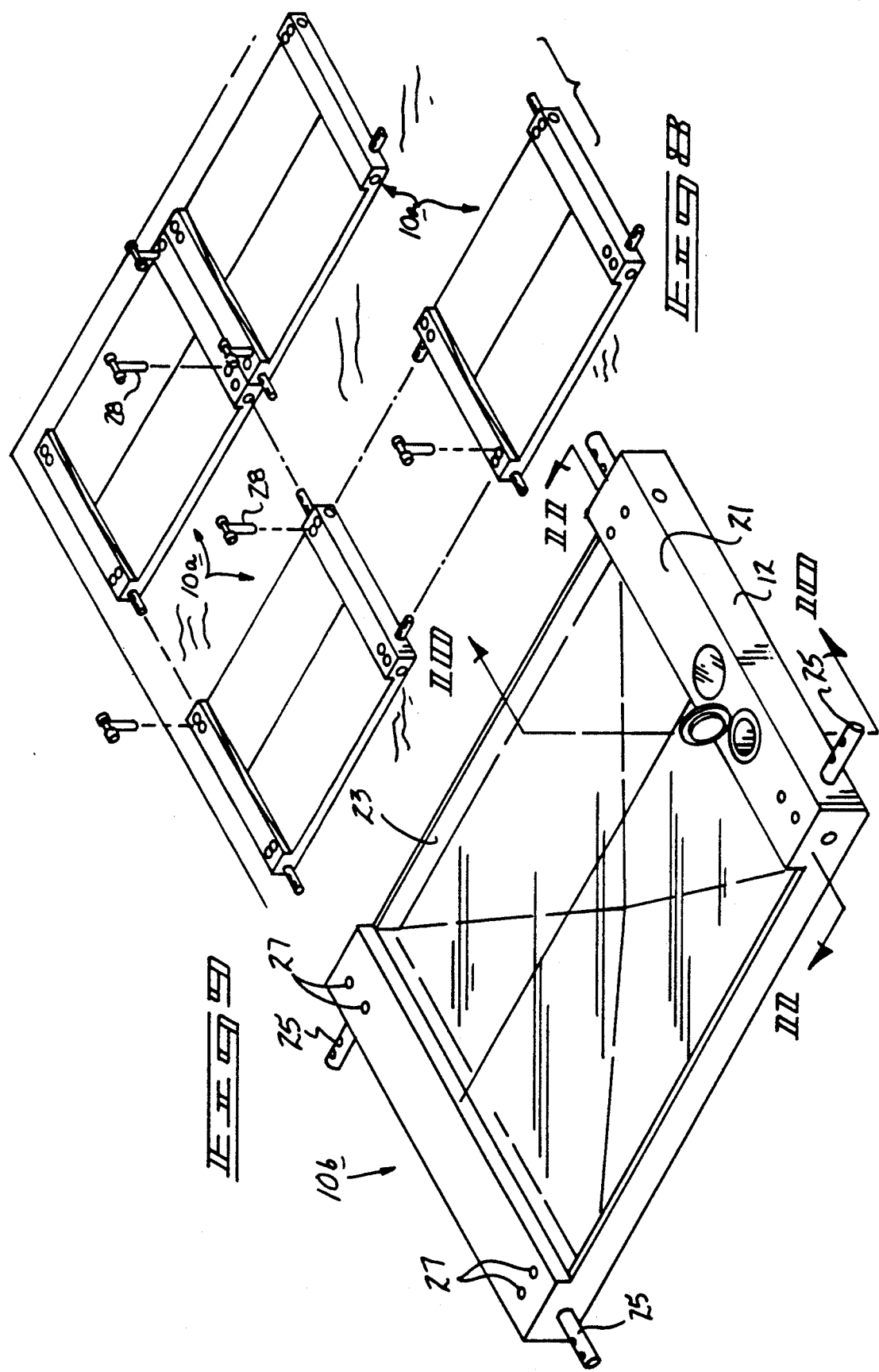

FLOATING POOL COVER APPARATUS

BACKGROUND OF THE INVENTION

1. Field of the Invention

The field of invention relates to swimming pool apparatus, and more particularly pertains to a new and improved foating pool cover apparatus wherein the same is arranged to provide for passive heating or passive protection from heat of an associated swimming pool structure.

2. Description of the Prior Art

Protective covering of various types are utilized relative to swimming pools to afford protection during periods of non-use. Further, passive solar heating and cooling of swimming pools has been utilized relative to prior art structure as set forth in U.S. Pat. No. 4,273,100 to Cogliano wherein an elaborate heat pipe heating and cooling interstructure is arranged to utilize a phase change material cooperative with a solar cell to effect a heating and cooling of an associated swimming pool.

U.S. Pat. No. 4,898,153 to Sherwood sets forth a solar energy panel utilizing spaced skins to employ a fluid input and output relative to the panel structure.

U.S. Pat. No. 4,149,520 to Arent sets forth a further example of a passive solar heating panel structure relative to an associated dwelling or building.

U.S. Pat. No. 4,858,594 to McCurdy sets forth a solar heating panel utilizing curvilinear passage ways to increase rate of heat exchange relative to the solar panel.

As such, it may be appreciated that there continues to be a need for a new and improved floating pool cover apparatus as set forth by the instant invention which addresses both the problems of ease of use as well as effectiveness in construction to provide for a pool cover organization specifically directed to swimming pools to enhance selective heating or affording protection from heat by a floating cover apparatus and in this respect, the present invention substantially fulfills this need.

SUMMARY OF THE INVENTION

In view of the foregoing disadvantages inherent in the known types of pool cover apparatus now present in the prior art, the present invention provides a floating pool cover apparatus wherein the same is arranged to provide for selective heating or affording protection from heat relative to an underlying pool structure. As such, the general purpose of the present invention, which will be described subsequently in greater detail, is to provide a new and improved floating pool cover apparatus which has all the advantages of the prior art pool cover apparatus and none of the disadvantages To attain this, the present invention provides a floating pool cover arranged for flotation about the top surface of a swimming pool to provide for passive heating during period of depressed temperatures and reflection of heat during periods of elevated temperatures and provided as a housing formed with an opaque darkened bottom floor and a convex transparent top, with ends defining a top wall of the housing, wherein spaced first and second buoyant chambers are formed coextensively at opposed end walls of the organization. The invention is further arranged to include interlocking pegs received within accommodating apertures between adjacent panels to provide for a matrix of the housings for flotation and accommodation of variously configured pools. Further, the organization may be optionally provided with a releasing chamber to direct chemical into the underlying pool during periods of elevated temperature conditions.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved floating pool cover apparatus which has all the advantages of the prior art pool cover apparatus and none of the disadvantages It is another object of the present invention to provide a new and improved floating pool cover apparatus which may be easily and efficiently manufactured and marketed.

It is a further object of the present invention to provide a new and improved floating pool cover apparatus which is of a durable and reliable construction.

An even further object of the present invention is to provide a new and improved floating pool cover apparatus which is susceptible of a low cost of manufacture with regard to both materials and labor, and which accordingly is then susceptible of low prices of sale to the consuming public, thereby making such floating pool cover apparatus economically available to the buying public.

Still yet another object of the present invention is to provide a new and improved floating pool cover apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is an orthographic end view of a lock pin utilized by the apparatus, as set forth in FIG. 7.

FIG. 5 is an orthographic front view of the lock pin.

FIG. 6 is an isometric illustration of the lock pin.

FIG. 7 is an isometric illustration of a modification of the invention.

FIG. 8 is an isometric illustration of the modification of the invention utilizing a plurality of the cover structures in an interlocking relationship.

FIG. 9 is an isometric illustration of a yet further modification of the invention.

DESCRIPTION OF THE PREFERRED EMBODIMENT

Figure 10:
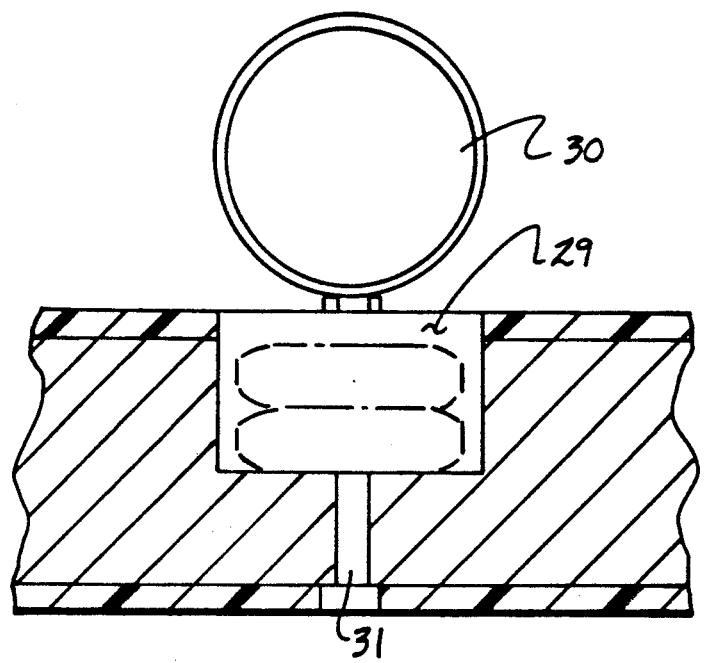
FIG. 10 is an orthographic view, taken along the lines 10—10 of FIG. 9 in the direction indicated by the arrows.
Figure 11:
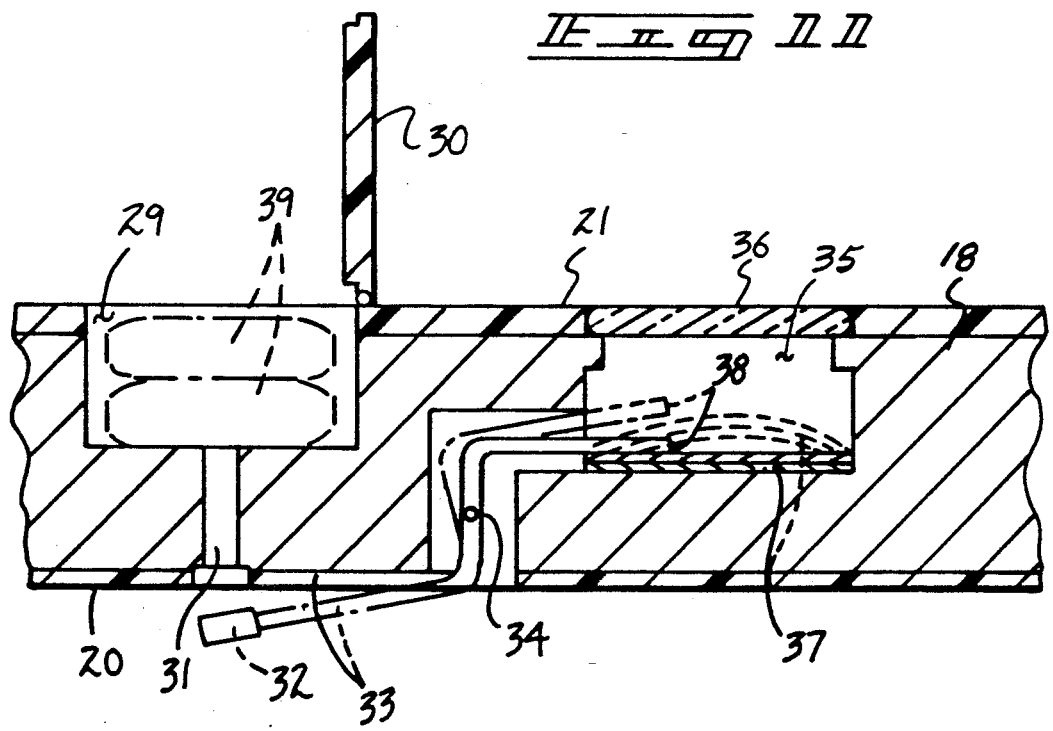
FIG. 11 is an orthographic view, taken along the lines 11—11 of FIG. 9 in the direction indicated by the arrows.

With reference now to the drawings, and in particular to FIGS. 1 to 11 thereof, a new and improved floating pool cover apparatus embodying the principles and concepts of the present invention and generally designated by the reference numerals 10, 10a, and 10b will be described.

More specifically, the floating pool cover apparatus 10 of the instant invention essentially comprises a housing 11 of a unitary construction, including a first end wall 12 spaced from and parallel a second end wall 13. A first side wall 14 is spaced from and parallel a second side wall 15, with a first chamber 16 orthogonally oriented between the first and second side walls 14 and 15 coextensively directed along the first end wall 12, with the first chamber 16 arranged parallel to and spaced from a second chamber 17 that is in contiguous communication and in coextensive relationship relative to the second end wall 13. The first chamber 16 includes a first polymeric buoyant insert 18 coextensively directed within the first chamber, wherein similarly, the second chamber includes a second polymeric buoyant insert 19. The first chamber defines a first chamber top wall and the second chamber defines a second chamber top wall 21 and 22 respectively that are arranged in a coplanar spaced relationship relative to one another, including a convex transparent or translucent lens 23 directed therebetween. The transparent lens is spaced from a darkened opaque (preferably black) housing bottom wall 20. In this manner, an air sealed cavity is defined between the lens 23 and the floor 20. The floor 20 during periods of heating is positioned to be positioned in confrontation with the sun for passive solar heating of the organization in an underlying pool structure, such as a manner as illustrated in FIG. 8, wherein the bottom of the device is arranged with a mirrored exterior surface to effect reflection of sunlight and thereby minimize heating of the underlying pool structure during periods of elevated temperatures. The device is inverted to float on the surface with the reflective side up, reflecting solar energy away from the body of water. In addition the captured air inside, now shaded by the opaque surface functions as a layer of insulation.

The apparatus 10a of the organization, as set forth in the FIG. 7, includes each end wall and each side wall formed with spaced parallel interconnecting members defined by a right receiving bore spaced from and parallel a left locking peg. The locking peg projects orthogonally and exteriorly of each end and side wall, whereas the receiving bore 24 is projected interiorly of the associated first and second chambers, as illustrated in the FIG. 7 In this manner, a plurality of panels, such as illustrated in FIG. 8, may be interlocked together, wherein each receiving bore 24 includes a plurality of pin receiving bores in intercommunication with the receiving bore 24. The spaced pin receiving bores 27 receive a respective lock pin 28 selectively through one of the pin receiving bores 27 for reception with an associated peg bore 26 of a plurality of spaced peg bores. In this manner, the pegs may be directed into a complementarily configured pin receiving bore 24 a predetermined distance to provide for a spacing between adjacent housings 11 or alternatively to completely project an associated peg 25 within a receiving bore 24 to provide for interlocked engagement of adjacent panels in a contiguous relationship, such as the top two panels in FIG. 8.

For economy of manufacture, the transparent lens is deleted with attendant short coming of such construction in loss of the fluid sealed cavity between the lens 23 and the wall 20.

The apparatus 10b, as illustrated in the FIGS. 8-11, includes an addition to the structure of FIG. 7, a first chamber first cavity 29 including a first chamber first cavity door 30 pivotally mounted thereto to provide access to the first cavity, wherein a plurality of chlorine and/or anti-bacterial tablets 39 may be positioned therewithin. The first cavity 29 is directed into the first chamber from the first chamber top wall 21, wherein the cavity conduit 31 in communication with the first chamber first cavity is directed through the bottom wall 20. A conduit plug 32 is positioned within the cavity conduit 31 at its intersection with the floor 20, wherein the plug 32 is fixedly mounted to a forward distal end of a plug lever 33 pivotally mounted about an axle 34 within the first chamber, wherein a rear distal end of the lever 33 is positioned upon the bottom bimetallic strip 37 positioned within a second cavity 35. A magnification lens 36 coplanar with the top wall 21 effects heating of the bi-metallic strip to effect pivotment of the lever 33 and displacement of the plug 32 relative to the exit opening of the associated cavity conduit 31 to permit fluid directed into the cavity conduit 31 for an underlying pool surface to slowly dissolve the tablets 39 for their application into the underlying pool.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A floating pool cover apparatus, comprising,
   a housing, the housing including a first end wall spaced from and parallel to a second end wall, and a first side wall spaced from and parallel to a second side wall, and
   a black opaque housing bottom wall spaced from a convex lens top wall, and
   a first chamber directed orthogonally between the first side wall and the second side wall contiguous with and coextensive the first end wall, and a second chamber coextensive and contiguous with the second end wall orthogonally oriented between the first side wall and the second side wall, wherein the first chamber includes a first chamber top wall and a first chamber bottom wall and the second chamber includes a second chamber top wall and a second chamber bottom wall wherein the first chamber top wall and the second chamber top wall are arranged in a coplanar relationship relative to one another spaced and parallel relative to one another, with the first chamber bottom wall and the first chamber top wall defining a first water-tight chamber therebetween the second chamber top wall and the second chamber bottom wall defining a second water-tight chamber therebetween, and
   the first chamber including a first buoyant insert coextensive within the first chamber, and the second chamber including a second buoyant insert coextensive within the second chamber, and
   the lens top wall is positioned between the first chamber top wall and the second chamber top wall, and
   each wall of said first end wall, second end wall, first side wall, and second side wall includes a projecting locking peg projecting exteriorly and orthogonally relative to each respective wall, wherein the locking peg includes a plurality of spaced peg bores diametrically directed through each peg, and each said wall further includes a receiving bore parallel to the locking peg spaced from the locking peg, wherein each receiving bore includes a plurality of pin receiving bores directed through the housing orthogonally communicating with each respective receiving bore, and at least one lock pin arranged for projection through one of said pin receiving bores of each receiving bore of each wall and at least one of said spaced peg bores to permit selective securement of a plurality of housing together.

2. An apparatus as set forth in claim 1 wherein the first chamber includes a first cavity, the first cavity includes a cavity door pivotally mounted to the first chamber top wall in communication with the first cavity, and the first cavity includes a cavity conduit directed from the first cavity through the bottom wall, wherein the first cavity includes at least one water soluble tablet contained therewithin to direct a chemical into an underlying body of water.

3. An apparatus as set forth in claim 2 including a second cavity formed within the first chamber spaced from and parallel the first cavity, and the second cavity including a magnification lens mounted above the second cavity coplanar with the first chamber top wall, and the second cavity including a bimetallic strip mounted to the second cavity below the magnification lens, and a lever mounted within the first chamber, and the lever includes a rear distal end overlying the bimetallic strip, and the lever includes a second distal end, with the second distal end including a plug, the plug directed into the floor in communication with the cavity conduit whereupon heating of the bi-metallic strip effects displacement of the lever relative to the bi-metallic strip and displacement of the plug relative to the cavity conduit.

* * * * *